United States Patent [19]
Blanding

[11] Patent Number: 5,315,411
[45] Date of Patent: May 24, 1994

[54] DITHERING MECHANISM FOR A HIGH RESOLUTION IMAGING SYSTEM

[75] Inventor: Douglass L. Blanding, Rochester, N.Y.

[73] Assignee: Eastman Kodak Company, Rochester, N.Y.

[21] Appl. No.: 325

[22] Filed: Jan. 4, 1993

[51] Int. Cl.⁵ .................. H04N 1/04; H04N 3/14; H04N 5/335
[52] U.S. Cl. .................. 358/482; 348/219; 348/250
[58] Field of Search .......... 358/471, 474, 482, 483, 358/487, 497, 513, 209, 213.11, 213.27, 213.28, 457

[56] References Cited
U.S. PATENT DOCUMENTS

| | | | |
|---|---|---|---|
| 4,517,603 | 5/1985 | Epsztein et al. | 358/213.28 |
| 4,543,601 | 9/1985 | Harada et al. | 358/209 |
| 4,581,649 | 4/1986 | Morokawa | 358/213.28 |
| 4,595,954 | 6/1986 | Endo et al. | 358/213.28 |
| 4,633,317 | 12/1986 | Uwira et al. | 358/213.28 |
| 4,667,255 | 5/1987 | Lindberg | 358/482 |
| 4,755,876 | 7/1988 | Dangler | 358/213.28 |
| 4,907,152 | 3/1990 | Lempriere | 358/213.28 |
| 4,910,413 | 3/1990 | Tamune | 358/213.28 |
| 4,947,239 | 8/1990 | Kondou et al. | 358/213.28 |
| 4,992,878 | 2/1991 | Hersh | 358/213.28 |
| 5,023,921 | 6/1991 | Goutte et al. | 358/213.28 |
| 5,182,652 | 1/1993 | Stephenson, III | 358/483 |
| 5,210,614 | 5/1993 | Kannegundla et al. | 358/213.27 |
| 5,214,513 | 5/1993 | Lee | 358/209 |
| 5,227,888 | 7/1993 | Haga | 358/213.11 |

Primary Examiner—Edward L. Coles, Sr.
Assistant Examiner—Thomas D. Lee
Attorney, Agent, or Firm—Robert L. Randall

[57] ABSTRACT

An apparatus for generating a high resolution image from an image sensor having a plurality of pixels with a preselected pitch with means for dithering the image sensor. The movement of the image sensor causes the pixels to map a new area of an image without overlap of a previously mapped area. The present invention provides a simple, economic, and reliable mechanism using cascaded levers for dithering the sensor or the input image.

8 Claims, 3 Drawing Sheets

DITHERING MECHANISM FOR A HIGH RESOLUTION IMAGING SYSTEM

FIELD OF THE INVENTION

This invention relates generally to an imaging system and, more particularly, to an apparatus for generating a high resolution image from an image sensor by dithering either the image sensor or the image source to generate an image having a resolution higher than the resolution of the image sensor, and more particularly, to a specific form of a dithering mechanism.

BACKGROUND OF THE INVENTION

In some conventional imagers, transparent images are sequentially scanned by projecting light through, or reflecting light from, the image and onto an image sensor, such as a CCD imaging array. The signal from the CCD array is conditioned so that an electronic output is generated from the scanned image. The input image may consist of a typical 35 mm slide or other forms of photographic sources. The CCD array typically consists of pixels disposed in rows and columns and producing an output formed as an array conforming to a standard format, for example, as video signals in the NTSC standard format or the PAL standard format. The array responds to the light from the light that is projected through or reflected from the image source that is focused onto the imager. The resulting electronic signal nay be stored for future use or it maybe employed to generate a new image.

One problem with prior art methods used to generate images is that the resolution has been limited by the resolution capable from the available image sensors, such as CCD arrays. Typically, a photographic image has several times the resolution of a CCD imager. What is actually on the original image may not be exactly what is seen by the CCD since the it only registers image data up to the ability of its resolution. Another problem is that only a fraction of the area of a CCD array is actually photoactive, i.e. the array is "sparse". To get a more accurate reproduction and thereby greater resolution, the CCD has to see more.

One method of providing the CCD with the ability to "see more" is disclosed in U.S. Pat. No. 4,638,371, entitled Multiple Exposure of Area Image Sensor Having A Sparse Array of Elements, which teaches that each sensor element is multiply exposed by different pixels of an image. The input image is scanned in such a pattern between element exposures that each digital image pixel has a nearest neighbor digital image pixel that was produced by a different sensor element. By this arrangement, a high quality image can be produced from the digital image even if a sensor becomes defective. A dithered sensor is disclosed that has a plurality of positions so as to create a sub-image. The system disclosed, however, does not disclose a simple, economic, and reliable mechanism for dithering the sensor or the input image. Dithering is the mechanical movement of the sensor or the input image in a predetermined pattern to change the image pixel elements that are sensed by the individual elements in an array of scanning elements.

Solid state image sensors generally have a linear or area organization. An area image sensor offers the advantage of increased integration time for each element. In some applications, a large number of image pixels have to be digitized. For example, to make a high quality color print of a photographic image, something on the order of about two million image pixels must be digitized for each color (red, green and blue) of input image to produce a high quality output signal. With existing technology, typical CCD area image sensors have about 300,000 elements. Thus, each element of an area image sensor must sample a plurality of image pixels. Thus, dithering is a technique to create an image of higher resolution than that which would ordinarily be produced with the sensor's normal capability. Accordingly, it will be appreciated that a simple, economic, and reliable mechanism for dithering the sensor or the input image would be highly desirable.

SUMMARY OF THE INVENTION

According to a first aspect of the present invention apparatus is provided for generating a high resolution image output from an image sensor having a plurality of pixels with a preselected pitch. The apparatus comprises means for dithering the image sensor with respect to an input image and producing arrays of data representing positions generated by step offsets of the image sensor with respect to the input image in at least one of a horizontal and a vertical direction so that the step movements causes the pixels to map a new area of an image. The dithering means comprises an arrangement of at least one set of cascaded levers which comprises a plurality of interconnected levers connected to a movable platform carrying one of the input image and the image sensor. The levers are arranged so that the output displacement of each lever is but a fraction of its input displacement, with the output of each lever being connected to the input of the succeeding lever and the output of the final lever being connected to the movable platform. Means is provided for applying an input force to a first lever, and a stop means is arranged to engage the first lever at a first and a second limit of its input displacement so that the input force applied to the first lever will produce a precise, repeatable, shift of the position of the movable platform, whereby the magnitude of the shift is not dependent upon the magnitude of the input force but is dependent only upon the geometry of the arrangement of levers and upon the position of the fixed stops which limit the motion of the first lever.

According to another aspect of the present invention, apparatus is provided for generating a high resolution image output from an image sensor having a plurality of pixels with a preselected pitch. The apparatus comprises means for dithering the image sensor with respect to an input image and producing arrays of data representing positions generated by step offsets of the image sensor with respect to the input image in at least one of a horizontal and a vertical direction so that the step movements causes the pixels to map a new area of an image. The dithering means comprises an arrangement of first and second sets of cascaded levers each of which comprises a plurality of interconnected levers connected to a movable platform carrying one of the input image and the image sensor, with the cascaded levers including levers, connections between levers and fulcrum connections to the levers monolithically formed from a single piece of sheet metal. The levers are arranged so that the output displacement of each lever is but a fraction of its input displacement, with the output of each lever being connected to the input of the succeeding lever and the output of the final lever being connected to the movable platform. A third set of cascaded levers is provided having at least one lever in common with a lever in one of the first and second sets of cascaded levers, with the third set of cascaded levers arranged to constrain the platform against rotation about an axis perpendicular to its surface. Mean is provided for applying an input force to a first lever of each set of cascaded levers, and a stop means is arranged to engage the first lever of the first and second set at a first and a second limit of its input displacement so that the input force applied to the first lever will produce a precise, repeatable, shift of the position of the movable platform, and the magnitude of the shift is not dependent upon the magnitude of the input force but is dependent only upon the geometry of the arrangement of levers and upon the position of the fixed stops which limit the motion of the first lever, whereby the position shift can be selectively made in two directions, with the first direction being along the direction of a row of pixels and the second direction being along the direction of a column of pixels. The first set of cascaded levers controls the position of the platform in the direction parallel to the pixel rows and the second set of cascaded levers controls the position of the platform in the direction parallel to the pixel columns.

Various means for practicing the invention and other features and advantages thereof will be apparent from the following detailed description of an illustrative, preferred embodiment, reference being made to the accompanying drawings.

DESCRIPTION OF THE PREFERRED EMBODIMENT

For the purpose of increasing the resolution of an image being acquired by an area type image sensor, such as a CCD array, it has been found that it is useful to do four successive "scans" with the CCD array repositioned relative to the image by a fraction of the pixel dimensions of the array; to the left and to the right of nominal, and to the top and to the bottom relative to the nominal position. This is called "dithering". The present invention relates to a means for causing an image sensor, such as a CCD array, to be repositioned by a small amount, typically a movement on the order of 4 microns, repeatably and reliably.

Figure 1:
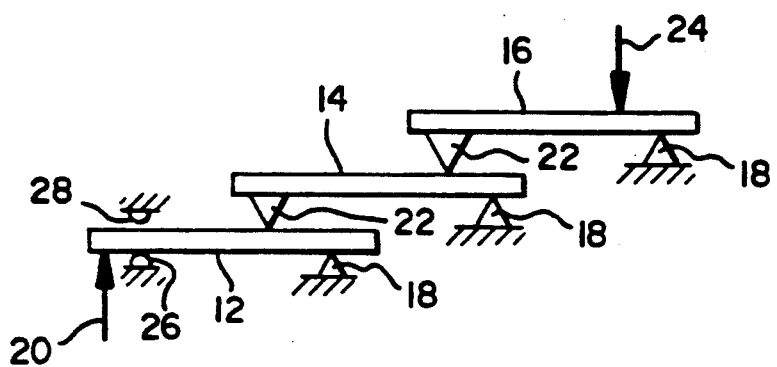
FIG. 1 is a schematic illustration of the principles embodied in the present invention.

Referring now to the drawings, in which like numerals indicate like elements throughout the several figures, FIG. 1 is a schematic illustration of an assembly of cascaded levers as they are used in the present invention. In this illustration three levers 12, 14, and 16 are cascaded to convert a small motion to an extremely small motion. Each of the levers is provided with a fulcrum 18 and the first lever is provided with an input force 20. The second two levers are provided with an input point 22 which bears on the next preceding lever. The last lever is arranged to output a small amount of movement to a load 24. The first lever 12 is provided with a pair of spaced stops 26 and 28 which limit the movement of the input end of that lever. As illustrated, the levers are "cascaded" so that for a given movement at the input point, the output will move only a small fraction thereof. Thus, when the first lever 12 is moved a small amount, i.e. the distance between the stops 26 and 28, the load 24 will move a much smaller distance. If, in the illustration each lever has an input arm to output arm ratio of 4:1, then the load will move $\frac{1}{4}^3$ or 1/64 of the distance moved by the input end of the first lever. Thus, if the stops 26 and 28 are set to allow the input end of the first lever 12 to move a distance of 0.010 inch, then the load 24 will move approximately 0.000156 inch which is about 4μ, the distance needed for the dithering movement as set forth above.

Figure 2:
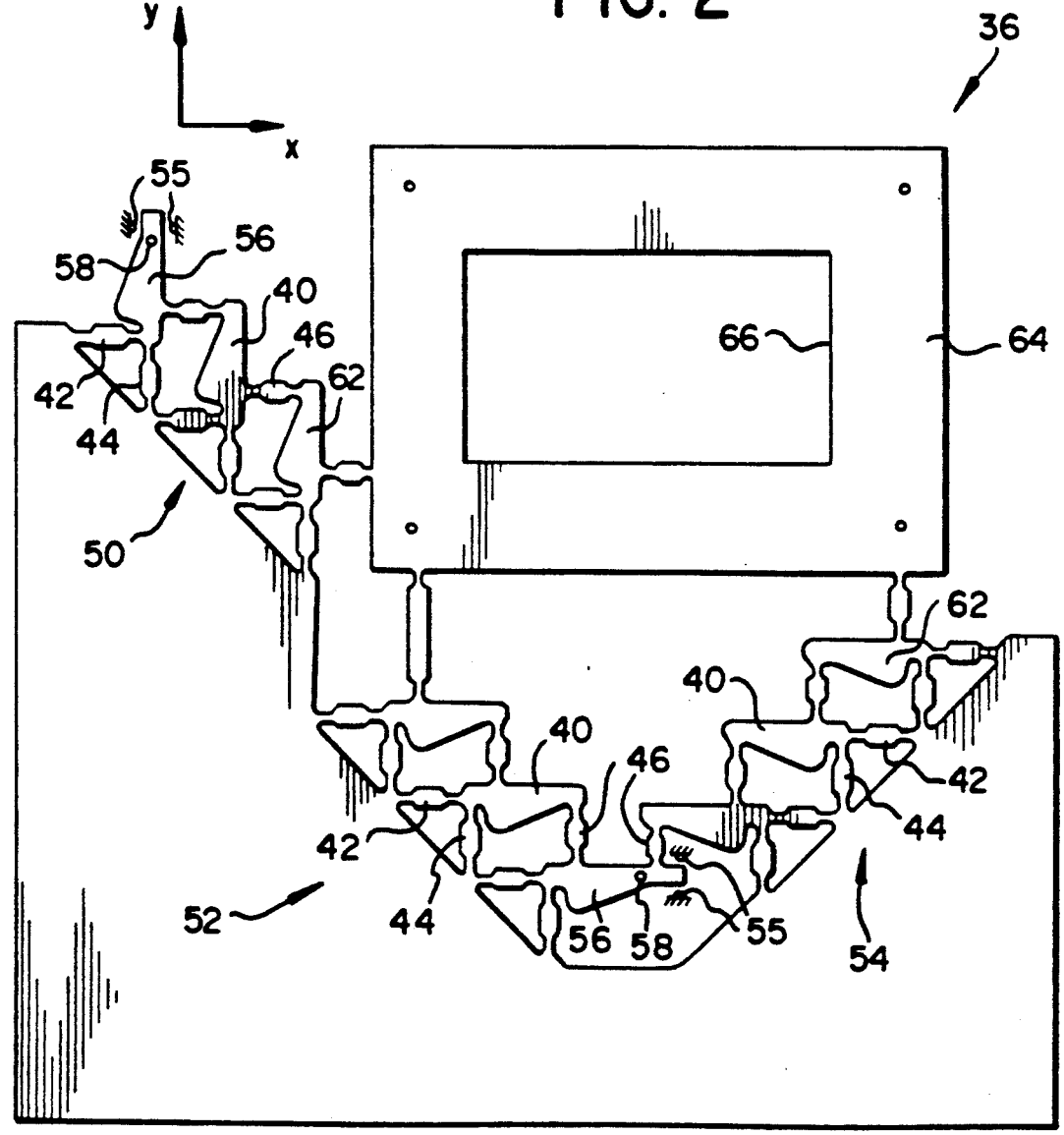
FIG. 2 is a plan view of an arrangement of cascaded levers for dithering an image sensor support platform.

In order to be inexpensive to manufacture, the three levers with fulcrums and interconnections between levers can be made as a dither assembly 36 of one sheet of material using photo etching technique of manufacture. As illustrated in FIG. 2, a monolithic sheet structure can be formed which replicates the lever arrangement illustrated in FIG. 1. The fulcrums for the levers 40 are formed by pairs of intersecting bars 42 and 44, whose width is reduced at the ends to permit flexure. Similarly, the interconnections between the levers is accomplished with another bar 46 of similar shape. Three sets of cascaded levers 50, 52, and 54 are illustrated in FIG. 2. Each of the sets includes a first, or input lever 56 which is provided with an aperture 58 which accepts an input rod 60 (shown in FIG. 3). The cascaded sets 52 and 54 share an input lever 56. A pair of stops 55 are provided for the input end of each of the first levers 56 to limit the input motion which can be imparted thereto. Each of the cascaded sets has an output lever 62 which is connected to a platform 64 which is provided with a central aperture 66 to accept the image sensor, not shown. One set of cascaded levers 50, constrains the platform 64 in the X direction while two sets of cascade levers 52 and 54 constrain the platform in the Y direction. The use of the two sets, 52 and 54, also constrains the platform 64 against rotation about the Z axis, perpendicular to the plane of the platform.

Considering the plane of the image sensor, or CCD array, to be the X-Y plane, the CCD array is mounted so that its position is fixed in four degrees of freedom; namely Z, θx, θy, and θz. The position of the CCD array in the X and Y directions is controlled by the dither assembly 36 of FIG. 2.

Figure 3:
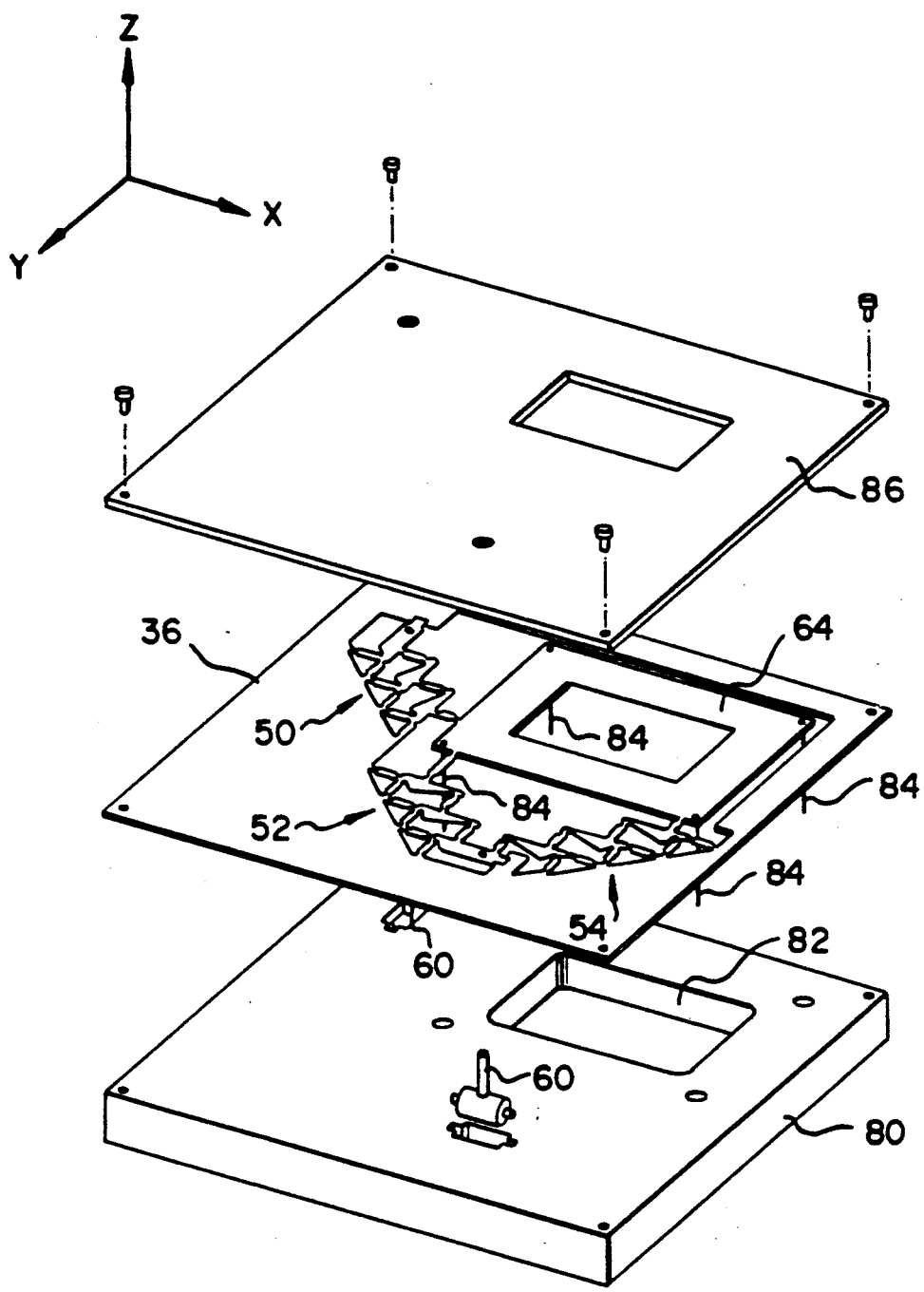
FIG. 3 is an exploded perspective view of an image dithering assembly.

An imaging assembly is illustrated in FIG. 3 wherein the dither assembly 36 is mounted on a base plate 80 which is provided with an aperture 82 in alignment with the aperture in the platform 64. The base plate is also provided with actuating input rods or levers 60 which mate with the apertures 58 in the first levers 56. The input rods or levers are operated by small solenoids or cams, not shown, to provide the input to the lever cascade.

The platform 64 is supported in the X-Y plane by a plurality of wire flexures 84 which are fixed at one end to the platform and at the other end to the base plate 80. The wire flexures have a sufficiently high aspect ratio of length to diameter, i.e. are sufficiently "slender", that they permit the platform to move in the X-Y plane without permitting the platform to move in the Z direction, along the optical path. The wire flexures must be stout enough that they will not buckle under the weight of the platform and any image sensor attached thereto, yet they must be slender enough to bend in order to permit the small motion of the platform in the X-Y plane required for the dithering of the image sensor.

The dither assembly 36 is held on the base plate by a suitably apertured cover plate 84.

ALTERNATIVE EMBODIMENT

Figure 4:
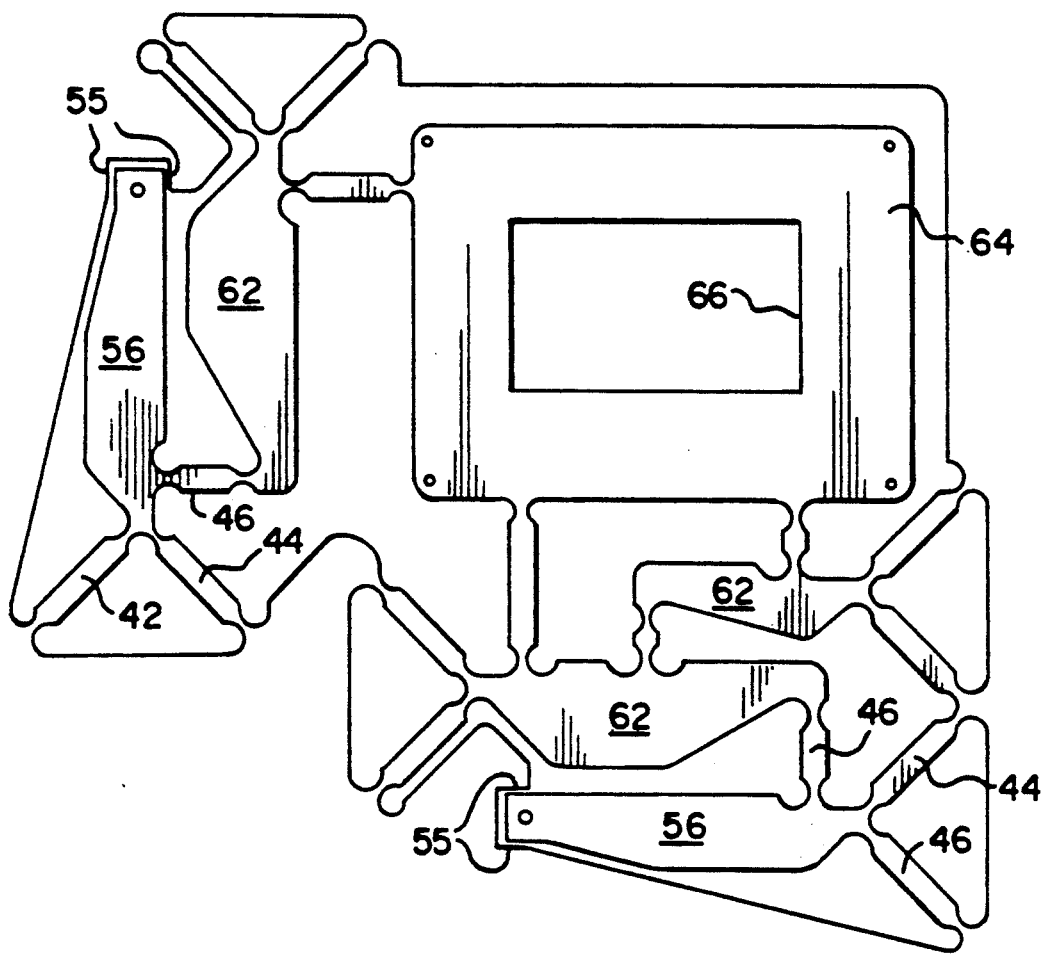
FIG. 4 is a plan view of an alternative embodiment of an arrangement of cascaded levers for dithering an image sensor support.

Referring now to FIG. 4, an alternate embodiment of the dither assembly is illustrated. In this embodiment, fewer levers are employed, each having a higher mechanical advantage than the arrangement disclosed for the preferred embodiment, to accomplish substantially the same result. It will be understood that many such variations are possible to provide the dithering motion desired without departing from the spirit of the present invention.

While the invention has been described with particular reference to the preferred embodiments, it will be understood by those skilled in the art that various other changes may be made and equivalents may be substituted for elements of the preferred embodiment without departing from invention. For example, the invention has been described as relating to mounting an image sensor on the platform for dithering movement; however, it will be appreciated that a source image to be scanned, such as a 35 mm transparency, or other image source, can be mounted on the dithering platform for movement relative to a stationary image sensor with equally satisfactory results. Similarly, other elements in the optical path, such as a mirror or other optical element can be mounted on the platform for dithering movement.

Accordingly, the present invention provides means for applying an input force to a first lever, and a stop means arranged to engage the first lever at a first and a second limit of its input displacement so that the input force applied to the first lever will produce a precise, repeatable, shift of the position of the dither platform, whereby the magnitude of the platform shift is not dependent upon the magnitude of the input force but is dependent only upon the geometry of the arrangement of levers and upon the position of the fixed stops which limit the motion of the first lever.

Moreover, the present invention provides an imaging platform support wherein the position shift can be selectively made in two directions, without affecting the location of the imaging platform or the image sensor along the optical path.

The invention has been described with reference to specific preferred embodiments and variations thereof, but it will be understood that other variations and modifications can be effected within the spirit and scope of the invention, which is defined by the following claims.

I claim:

1. Apparatus for generating a high resolution image output from an image sensor having a plurality of pixels with a preselected pitch, comprising:
    means for dithering said image sensor with respect to an input image and producing arrays of data representing positions generated by step offsets of said image sensor with respect to the input image in at least one of a horizontal and a vertical direction so that said step movements causes said pixels to map a new area of an image,
    said dithering means comprising an arrangement of at least one set of cascaded levers which comprises a plurality of interconnected levers connected to a movable platform carrying one of the input image and the image sensor, said levers being arranged so that the output displacement of each lever is but a fraction of its input displacement, with the output of each lever being connected to the input of the succeeding lever and the output of the final lever being connected to said movable platform,
    means for applying an input force to a first lever, and stop means arranged to engage said first lever at a first and a second limit of its input displacement so that said input force applied to said first lever will produce a precise, repeatable, shift of the position of said movable platform, and the magnitude of said shift is not dependent upon the magnitude of the input force but is dependent only upon the geometry of the arrangement of levers and upon the position of the fixed stops which limit the motion of the first lever.

2. The dithering apparatus according to claim 1, wherein said cascaded levers include levers, connections between levers, and fulcrum connections to the levers.

3. The dithering apparatus according to claim 2, wherein the levers, the connections between levers, the fulcrum connections to the levers, the fixed stops, and the platform are all monolithically formed from a single piece of sheet metal.

4. The dithering apparatus according to claim 1, wherein the position shift can be selectively made in two directions; the first direction being along the direction of a row of pixels and the second direction being along the direction of a column of pixels.

5. The device of claim 4, wherein one set of cascaded levers controls the position of the platform in the direction parallel to the pixel rows, and a second set of cascaded levers controls the position of the platform in the direction parallel to the pixel columns.

6. The device of claim 4, wherein a third set of cascaded levers constrains the platform against rotation about an axis perpendicular to its surface.

7. The device of claim 6, wherein some of the levers of the third set of cascaded levers are common with some of the levers of said second set of cascaded levers.

8. Apparatus for generating a high resolution image output from an image sensor having a plurality of pixels with a preselected pitch, comprising:
    means for dithering said image sensor with respect to an input image and producing arrays of data representing positions generated by step offsets of said image sensor with respect to the input image in at least one of a horizontal and a vertical direction so that said step movements causes said pixels to map a new area of an image,
    said dithering means comprising an arrangement of first and second sets of cascaded levers each of which comprises a plurality of interconnected levers connected to a movable platform carrying one of the input image and the image sensor, said cascaded levers including levers, connections between levers and fulcrum connections to the levers monolithically formed from a single piece of sheet metal, said levers being arranged so that the output displacement of each lever is but a fraction of its input displacement, with the output of each lever being connected to the input of the succeeding lever and the output of the final lever being connected to said movable platform,
    a third set of cascaded levers having at least one lever in common with a lever in one of said first and second sets of cascaded levers, said third set of cascaded levers arranged to constrain said platform against rotation about an axis perpendicular to its surface, means for applying an input force to a first lever of each set of cascaded levers, and stop means arranged to engage said first lever at a first and a second limit of its input displacement so that said input force applied to said first lever will produce a precise, repeatable, shift of the position of said movable platform, and the magnitude of said shift is not dependent upon the magnitude of the input force but is dependent only upon the geometry of the arrangement of levers and upon the position of the fixed stops which limit the motion of the first lever, whereby said position shift can be selectively made in two directions, with the first direction being along the direction of a row of pixels and the second direction being along the direction of a column of pixels and the first set of cascaded levers controls the position of the platform in the direction parallel to the pixel rows and the second set of cascaded levers controls the position of the platform in the direction parallel to the pixel columns.

* * * * *